United States Patent [19]
Guyot

[11] 3,792,344
[45] Feb. 12, 1974

[54] SYSTEM FOR PROCESSING ELECTRICAL SIGNALS INCLUDING MEANS FOR EFFECTIVELY INCREASING THE LENGTH OF A DELAY LINE

[75] Inventor: Joel Guyot, Paris, France
[73] Assignee: Thomson-CSF, Paris, France
[22] Filed: Mar. 20, 1972
[21] Appl. No.: 236,099

[30] Foreign Application Priority Data
Mar. 23, 1971 France .................................. 7110135

[52] U.S. Cl. .............................. 324/77 D, 324/78 R
[51] Int. Cl. ............................................. G01r 23/02
[58] Field of Search.. 324/77 D, 77 B, 78, 82, 77 H; 328/56

[56] References Cited
UNITED STATES PATENTS
3,150,324  9/1964  Hallden et al. ...................... 328/56
2,951,202  8/1960  Gordon ......................... 324/78 D X OTHER PUBLICATIONS
Tournois et al., "J. Acoust. Soc. Amer.;" Vol. 46, No. 3, 1969, pp. 517–531.

*Primary Examiner*—Alfred E. Smith
*Attorney, Agent, or Firm*—Edwin E. Greigg

[57] ABSTRACT

A system for processing electrical signals in different ways operating on the theory of an artificial increase in the length of a dispersive delay line. The system comprises a dispersive circuit having a controlled input switch for partially injecting a signal into a dispersive line and connecting the output of the delay line to its input to circulate the injected signal. An output switch connects the delay line to a load. A rhythm generator controls the input and output switches in order that the signal being processed circulates $n$ times through the line prior to application to the load circuit.

10 Claims, 6 Drawing Figures

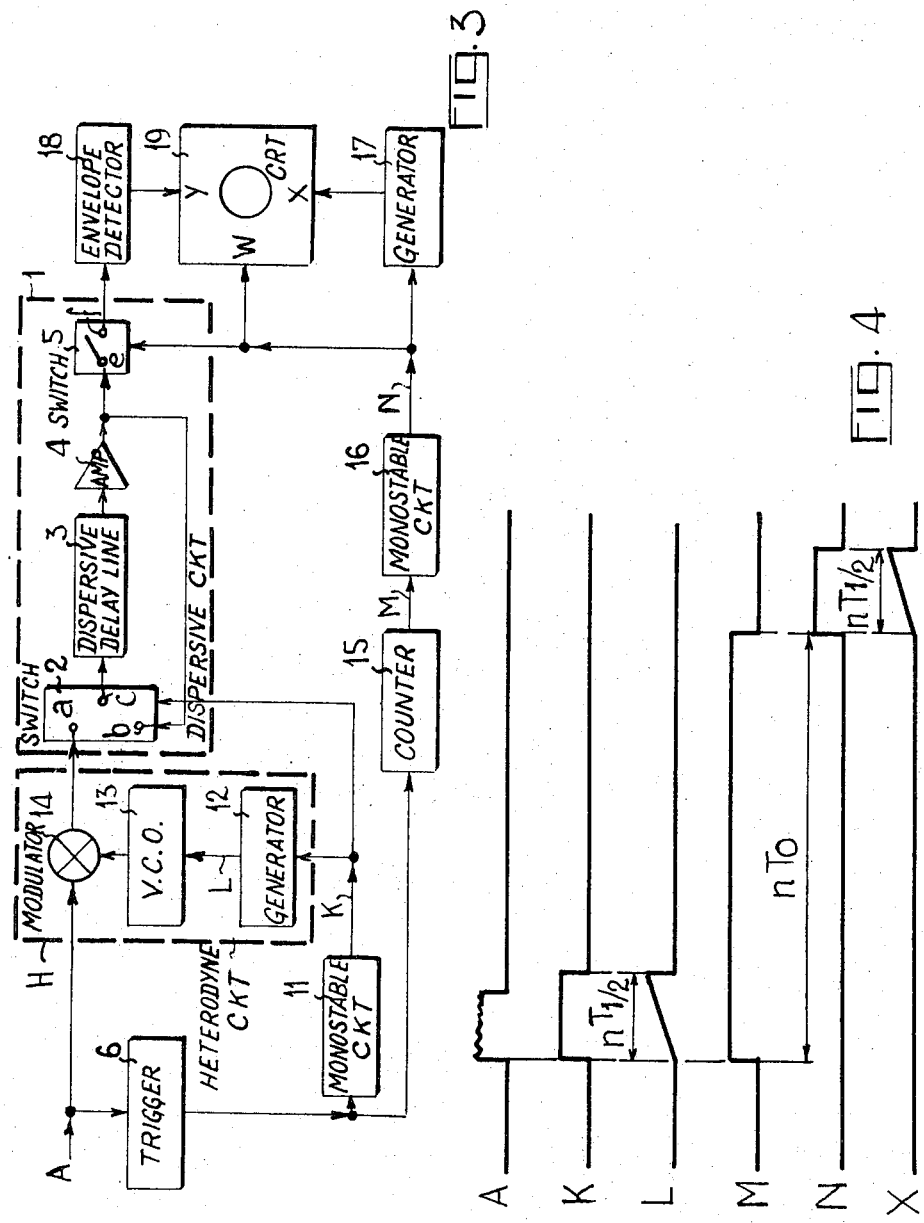

3,792,344

SYSTEM FOR PROCESSING ELECTRICAL SIGNALS INCLUDING MEANS FOR EFFECTIVELY INCREASING THE LENGTH OF A DELAY LINE

BACKGROUND OF THE INVENTION

The invention is chiefly applicable to frequency measurement, spectral analysis and matched filtering of electrical signals.

The present invention relates generally to improvements in methods and systems for processing electrical signals, and in particular to methods and systems such as described in the article by P. Tournois and J. Bertheas entitled "Use of Dispersive Delay Lines for Signal Processing in Underwater Acoustics," which appeared in Vol. 46, No. 3, of 1969, of the "Journal of the Acoustical Society of America," at pages 517–531 thereof.

These methods and systems employ the property of dispersive delay lines in accordance with which they exhibit a variation $T_1$ in their group delay which may be linear within a frequency band of bandwidth $B_1$. Thus, for example, they enable spectral analysis or matched filtering of electrical signals to be carried out.

Whatever the nature of the processing envisaged, the essential characteristic of the dispersive lines utilized is their product $B_1T_1$, that is to say, the product of the range $T_1$ of the linear variation in their group delay and the bandwidth $B_1$ of the band of frequencies in which said linear variation is encountered. Generally speaking, it is advantageous for this product $B_1T_1$ to be as large as possible. With the bandwidth $B_1$ fixed, an increase in the product $B_1T_1$ can only be obtained by increasing the value of $T_1$ and this is achieved by using longer lengths of line. However, the length of a dispersive delay line cannot be increased arbitrarily without encountering major drawbacks. The longer the length, the worse the deviation from the linear of the dispersion curve represented by the delay time as a function of frequency, from this kind of line.

Depending upon the nature of the process which is to be carried out, the maximum linearity deviation which can be tolerated makes it possible to define a maximum value in the product $B_1T_1$, beyond which the quality of the processing is no longer acceptable. However, in the majority of electrical signal processing systems which use dispersive lines, the value of the products $B_1T_1$ of these lines is made very much less than the above-defined maximum values. This is due in particular to the fact that in order to obtain these maximum values of the product $B_1T_1$, it is necessary to use dispersive lines of substantial length.

It is well known that the longer a dispersive line is, the higher is its cost and the greater are the technological difficulties in producing it. This is why, whatever the manufacturing technique used, the product $B_1T_1$ of the dispersive lines thus far known rarely exceeds the value of 200. This corresponds in most applications to a linearity error which is very much less than that which can be effectively tolerated.

To manufacture dispersive lines of short length which overcome certain technological problems, a chosen value of the product $B_1T_1$ can be achieved by arranging in series several of these lines; such lines can be said to constitute different sections of one and the same dispersive line. However, this kind of solution to the problem is a very expensive and bulky one.

SUMMARY OF THE INVENTION

One object of the present invention is to overcome the above drawbacks by producing a dispersive circuit the product $B_1T_1$ of which is as close as possible to the maximum permissible value, and the cost of which is as low as possible.

In accordance with one feature of the present invention, a method and system of processing electrical signals, utilizing dispersive delay lines which have a linear dispersion characteristic of $T_1/B_1$, where $T_1$ is the range of linear variation with time of the group delay and $B_1$ is the frequency band, is characterized essentially in that the signal being processed in the system containing said dispersive delay line is at least partially injected into the delay line under the control of an operating rhythm signal of predetermined duration; the rhythm signal also switches the output of the delay line to its input in order to cause the injected signal to circulate there n successive permissible times. The rhythm signal also triggers a timing circuit of predetermined delay which, after the elapse of said delay, controls the connection of the output carrying the processed signal to a load circuit. In this manner the slope $T_1/B_1$ is increased by the value $n$ and the dispersive line is equal to $n$ $B_1T_1$.

For the implementation of the method, in the context of the various possible applications, in accordance with another feature of the present invention the electrical signal processing system is distinguished primarily in that said system comprises a dispersive circuit in which a dispersive delay line has its input connected to an output of a switch and its output connected to an amplifier responsible for compensating insertion losses in respect of each circulation of the signal being processed. The signal to be processed is applied to a first input of said switch, and the output of said amplifier is connected to a second input of the switch and to an input terminal of a contact breaker. The output terminal of the contact breaker in its closed position produces the processed signal. The switch is primarily controlled by the generator producing the operating rhythm signal.

BRIEF DESCRIPTION OF THE DRAWINGS

Other features and advantages of the present invention will become apparent during the course of the ensuing description, given purely by way of non-limitative example, and relating to the attached figures in which:

FIG. 3 is an example of a system designed for spectral analysis, utilizing a dispersive circuit in accordance with the invention;

FIG. 4 illustrates diagrams of signals associated with the system of FIG. 3;

DESCRIPTION OF THE EMBODIMENTS

In the process according to the presnt invention, the property of dispersive delay lines is made use of. The characteristic of the property is that the dispersion curve of the group delay as a function of frquency is linear within a bandwidth $B_1$ and has a slope $B_1/T_1$ where $T_1$ is the width of the linear range of variation of this group delay time. To increase the product $B_1T_1$ is equivalent to increasing the slope $T_1/B_1$. In order to increase the product $B_1T_1$ of a dispersive delay line, the method of the present invention primarily utilizes several consecutive circulations of the input signal through the delay line.

Figure 1:
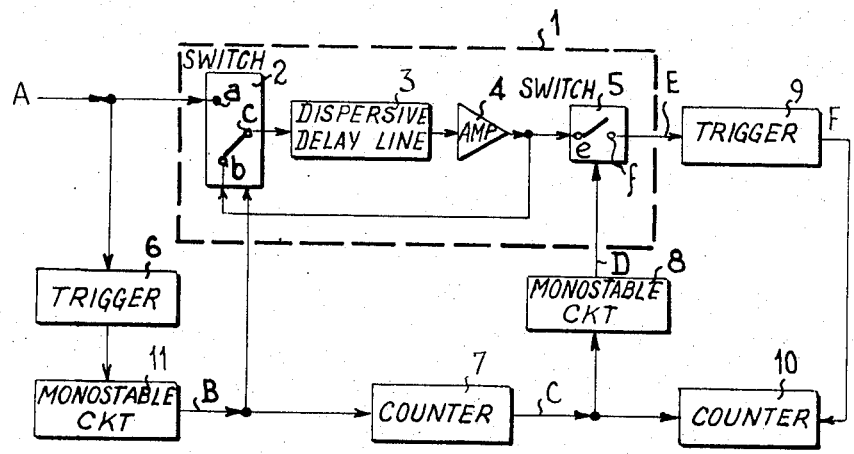
FIG. 1 illustrates an example of a processing system designed for frequency measurement, utilizing a dispersive circuit in accordance with the invention.

A dispersive circuit in accordance with the present invention is represented by the block 1 in FIG. 1. It is made up of a switch 2 having two inputs, termainals $a$ and $b$, and an output, terminal $c$. Terminal $c$ is connected to the input of a dispersive delay line 3 characterized by its range $T_1$ of linear variation of the delay, the width $B_1$ of the frequency band in which said linear variation takes place, and the value $T_0$ of the mean delay. The output of the line 3 is connected to an amplifier 4. The output of amplifier 4 is connected to the input terminal $b$ of the switch 2. The output of amplifier 4 is also connected to a contact breaker 5 at terminal $e$. Contact breaker 5 also includes an output terminal $f$ connected to the output E of the dispersive circuit 1.

The input signal A is applied to a terminal of the processing system which is connected to the input terminal $a$ of the switch 2. An initial command switches the movable contact arm of switch 2 and interconnects the terminals $a$ and $c$ of the switch 2 in order to inject into the dispersive delay line 3 the whole or at least a part of the input signal A, depending upon the particular application envisaged. Then, the movable contact arm is returned to its initial position such that the switching now links the terminals $b$ and $c$ for a time equal to that of $n$ circulations of the signal. These circulations are effected through a loop circuit formed with the line 3 and the amplifier 4 whose function is to compensate the insertion losses associated with the circulation.

The bandwidth $B_1$ of the dispersive line 3 is that of the dispersive circuit 1, while the range of linear variation in the delay time of the latter then becomes equal to $nT$. Thus, artificially, the product $B_1T_1$ of the dispersive line 3 is increased by a factor of $n$. the non-linearity of the dispersion curve of the circuit 1 increases with each circulation, so that the maximum number of circulations is defined by the maximum value which can be tolerated as a consequence of this deviation.

FIG. 1 illustrates a first advantageous system application of a dispersive circuit 1 in accordance with the invention. The object of this system is to measure the frequency of signals A which are constituted, for example, by isolated frequency pulses of duration $t$ less than t delays $T_0 - T$ and $nT_1$. This is the kind of situation encountered for example in certain radar signals.

Figure 2:
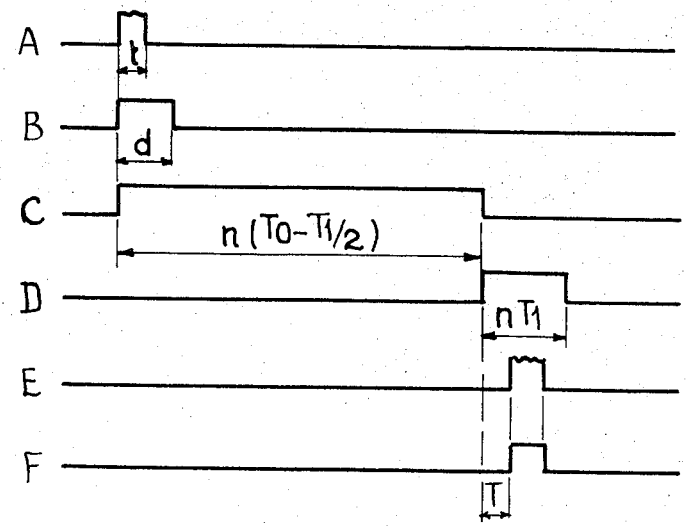
FIG. 2 illustrates diagrams of signals associated with the system of FIG. 1.

The description which now follows should be considered in connection with FIG. 2 which illustrates the signals at the various points A, B, C . . . through F of the device shown in FIG. 1. The time of arrival of the pulse A is detected by a trigger circuit 6, the output of which is connected to a monostable trigger circuit 11 whose relaxation time $d$ is less than $T_0 - T$. These two circuits form a generator which produces the operation control or rhythm signal. The rise component of the signal B produced by the monostable trigger stage 11, simultaneously controls the positioning of the switch 2 in its first position thereby connecting $a$ to $c$, and the start of counting of counter 7. The decaying component of the signal B controls the positioning of the switch 2 to its second position thereby connecting $b$ to $c$. Switch 2 is shown diagrammatically as a single pole double throw switch, and it should be readily apparent that any conventional relay operated or active electronic switch circuit may be utilized which can be controlled by the leading and trailing edges of the rhythm signal B.

The counter 7, which constitutes a timer circuit, determines the number $n$ of circulations of the pulse A through the circuit 1. To this end, the output of counter 7 is a rectangular waveform signal C of duration n $(T_0 - T)$ the decay portion of which controls the triggering of a monostable trigger stage 8 having a relaxation time $nT_1$. The rise component of the signal D produced by the monostable trigger stage 8 controls the closing of the contact breaker 5 (diagrammatically illustrated for simplicity as a single pole single throw switch element). Obviously relay controls or electronic switching may be utilized. The decay component of signal D controls the opening of the contact breaker.

The appearance of the signal E at the output of the circuit 1 upon connection of terminals $e$ and $f$ is detected by a trigger stage 9 having an output F. The rise component of the signal F produced by this trigger stage is applied to counter 10 to halt the counting operation of counter 10 previously triggered by the decay component of the signal C produced by the counter 7. The counter 10, which constitutes the load circuit, thus measures a time interval T proportional to the difference between the frequency of the processed signal A and the lowest frequency of the band $B_1$. The precision with which this time interval T is measured improves with larger factors of $n$ in view of the fact that the modification of factor $n$, that is to say, the number of circulations, introduces a similar modification in the time scale.

In the particular application, described in relation to FIGS. 1 and 2, the function of the circuit 1 is to delay the input signal A by a value proportional to its frequency. If the center frequency of the circuit 1 is not of the same order of magnitude as that of the processed signal A, then it is necessary to convert the frequency of the signal A in order to carry out the measurement of its frequency under the condition hereinbefore defined.

FIGS. 3 and 4 respectively illustrate a block diagram and diagrams of the signals associated with another application of a dispersive circuit 1 in accordance with the invention. The object of this system is to carry out spectral anaylsis of electrical signals, in particular highfrequency signals. In a system of this kind, in a manner known *per se*, the input signal A being analyzed is heterodyned with a signal which is linearly frequency-modulated through a frequency sweep, the width of which is equal to half the bandwidth $B_1$ of the dispersive circuit utilized to carry out the spectral analysis proper. The number of spectrum lines produced by this kind of device is equal to $B_1T_1/4$ and this number is thus increased by a factor of $n$ by utilizing a dispersive circuit 1 in accordance with the invention.

Referring to FIG. 3, the arrival of a signal A is detected by a trigger stage 6 which produces a signal whose rise component simultaneously triggers a monostable trigger stage 11 and a counter 15. The rise component of a rectangular waveform signal K produced by the monostable trigger stage 11, simultaneously triggers a generator 12 producing a signal L of ramp or sawtooth form, having a linear rise, and also sets the switch 2 of the dispersive circuit 1 to the input $a$. The duration of the rectangular waveform signal K is equal to $nT_1/2$ and the K component simultaneously halts the generator 12 and positions the switch 2 on $b$. The linear sawtooth waveform L produced by the element 12, controls oscillator 13 whose frequency is controlled and whose output is connected to a modulator 14, these three elements constituting a heterodyning system H. A second input to the modulator is supplied from the input line and comprises the signal A to be analyzed. The output of the heterodyne circuit is connected to the input $a$ of the switch 2. Thus, the signal A for analysis is heterodyned by a signal which is linearly frequency-modulated through a sweep of $(B_1/2)$.

Counter 15 supplies a signal M of duration $nT_0$, the decay component of which triggers a monostable trigger stage 16. The signal N produced by this monostable trigger stage simultaneously, through it rise component, controls the closing of the contact breaker 5 and the triggering of another ramp or sawtooth generator 17, while its decay component controls the opening of the contact breaker 5. The duration of the rectangular waveform signal N is equal to $nT_1/2$.

The spectrum thus detected is displayed by connecting the output of the circuit 1 through an envelope detector circuit 18 to the input Y of a display unit 19 constituted here by a cathode-ray tube. The tube is also supplied at its X input with the signal coming from the sawtooth generator 17. The modulating electrode W of the unit 19 is furthermore advantageously controlled by the signal N coming from the monostable trigger stage 16.

Thus, a spectral analyzer has been described which produces $nB_1T_1/4$ spectrum lines in respect to each signal A analyzed. In order to prevent malfunctioning of this analyzer due to the possible overlapping of the signal during two consecutive circulations, the number $n$ of said circulations is limited to a value which is always less than or at the most equal to $T_0/T_1$.

The dispersive circuit in accordance with the invention is well suited for utilization in a real-time spectral analyzer. The block diagram of FIG. 5 and the signal diagrams of FIG. 6 illustrate this kind of application. A system of this sort is able, at the end of a time interval $t_o$ and with a resolution of $1/t_o$, to furnish the frequency spectrum of a section of duration $t_o$, of an electrical signal.

To this end, there is provided at the input a system for effecting time-compression of the signal sections being analyzed, in which system said sections are successively sampled and quantised, fed to a buffer store and converted back at the output into an analog signal whose duration is compressed by a selected time-compression factor. This factor is equal to the ratio of the frequency of read-out of the sample in the store, and the frequency of sampling of the input signal.

Figure 5:
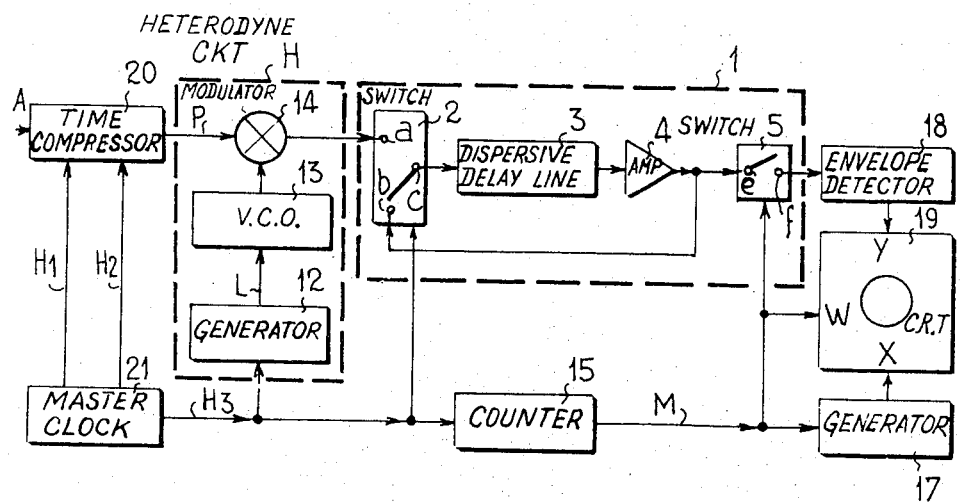
FIG. 5 illustrates an example of a system designed for real-time spectral analysis, utilizing a dispersive circuit in accordance with the invention.
Figure 6:
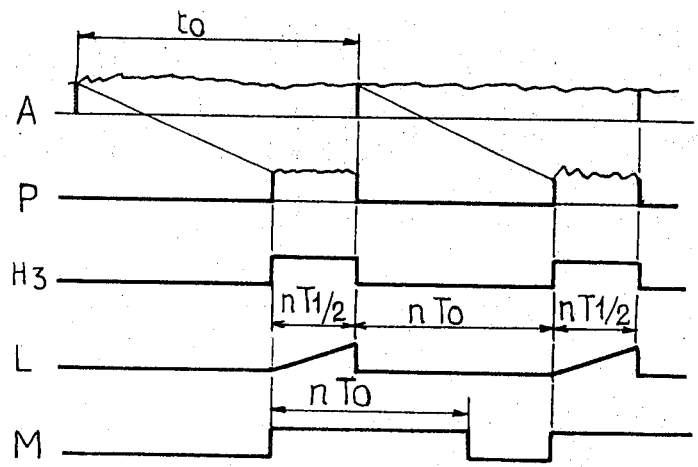
FIG. 6 illustrates diagrams of signals associated with the system of FIG. 5.

Referring to FIG. 5, this time-compression of the sections of the signal A, is effeected by the time compressor circuit 20 controlled by signals $H_1$ and $H_2$ derived from a master clock 21. Clock 21 additionally produces a signal $H_3$ applied to control a sawtooth generator 12, the output signal L of which, with its linear rise, is applied to an oscillator 13 of controlled frequency, connected to the modulator 14 of the heterodyning system H. This modulator receives at one input the time-compressed sections P of the input signal A from the compressor 20. The duration of the compressed sections P is equal to $nT_1/2$ and corresponds to that of the rectangular waveforms of the clock signal $H_3$. The rise component of the rectangular waveforms $H_3$ triggers a counter 15 and sets the switch 2 to position $a$. The decay component of these rectangular waveforms is responsible for setting the switch 2 to position $b$. At the end of a time $nT_0$, the counter 15, through the agency of the decay component of the signal M, causes closure of the contact breaker 5 for the time $nT_1$ and triggers a sawtooth generator 17 connected to the input X of a display element 19. The Y input of the display element is supplied through an envelope detector 18 with a spectrum furnished by the circuit 1.

Subsequently the clock signal $H_3$, by again triggering the operation of the counter 15, acts through the agency of the rise component of the signal M from the counter, to open the contact breaker 5 and stop the generator 17.

In order to take account of transient phenomena, advantageously the value of the factor $n$ will be made less than or equal to $T_0/T_1$. As far as the time-compression factor of the system 20 is concerned, this is made at least equal to $$k = (nT_0 + nT)/nT) = 1 + (2T_0)/T_1$$

The number of spectrum lines obtained in real-time by means of this kind of analysis device is thus equal in this case to $nB_1T_1/4$.

A system has been described, then, which enables the product $B_1T_1$ of dispersive delay lines to be increased, which system is particularly advantageous as far as the ratio between performance and price of equipment such as frequency meters or spectral analyzers is concerned.

That which is claimed is:

1. A signal processing system comprising, in combination:
   a. a system input for signals to be processed and a system output for processed signal;
   b. a dispersive delay line having a linear dispersion characteristics of $T_1/B_1$ where $T_1$ is the range of linear variation with time of the group delay and $B_1$ is the frequency band, said dispersive delay line having an input and an output;
   c. a circuit connecting the output of said dispersive delay line to the input thereof to form a signal re-circulating loop;
   d. first coupling means for selectively connecting to said dispersive line input said system input and said loop respectively during signal entry and signal re-circulation operation phases of predetermined periodicity;
   e. second coupling means for selectively connecting said delay line output to said system output at the expiration of the recirculation phase; and
   f. means for actuating said first coupling means and said second coupling means a predetermined number of times in synchronism, said means for actuating including means for generating timing signals in the form of a rectangular waveform signal having a duration less than $T_0 - T$, where $T_0$ is the mean delay of said dispersive delay line, said means for generating having its input connected to said system input and responsive to signals to be processed which appear thereat.

2. A system as set forth in claim 1, wherein said first coupling means comprises a switch coupled to said means for actuating and responsive to a timing signal therefrom and actuated between first and second positions under the control of the rise component and the decay component of the timing signal.

3. A system as set forth in claim 1, including an amplifier connected to the output of said delay line to compensate for insertion losses in said delay in respect of each signal injected, said amplifier having an output connected to the input of said dispersive delay line when said first coupling means is in a second position during the recirculation phase and to said second coupling means.

4. A system as set forth in claim 3, wherein said first coupling means comprises a switch adapted to be actuated between first and said second position under the control of the rise component and the decay component of the timing signal and said second coupling means comprises a contact breaker adapted to be actuated from an open to a closed position to connect the output of said delay line to said system output.

5. A system as set forth in claim 1, wherein said second coupling means comprises a contact breaker and said first coupling means comprises a switch element, said contact breaker and said switch element being controllably coupled to said means for actuating and responsive to timing signals therefrom, the timing signals being such as to double rhythm of operation.

6. A system as set forth in claim 1, wherein said means for generating timing signals comprises a trigger stage and a monostable trigger circuit connected to said trigger stage and responsive to signals therefrom for producing the rectangular waveform control signal of a duration less than $T_0 - T$, said trigger stage having its input connected to said system input and responsive to signals to be processed which appear thereat.

7. A system as set forth in claim 6, wherein said means for actuating comprises a timing circuit having a delay of $n(T_0 - T)$ which includes a first counter, a monostable trigger stage connected between said first counter and said second coupling means, said monostable trigger being operated by the end of the signal from said first counter so as to maintain said second coupling means in a position to connect said output of said dispersive delay line to said system output during a time $nT_1$ of output signal of said monostable trigger in order to supply the processed signal delayed by a time proportional to the frequency difference between these signals and the frequency corresponding to the minimum delay $n(T_0 - T)$ of said dispersive delay line, the processed signal being applied to the system output.

8. A system as set forth in claim 7, wherein said system output is coupled to a load circuit which comprises a second trigger stage which receives the processed output signal of said dispersive delay line, a second counter having an input connected to an output of said second trigger stage, said second counter being triggered by the decay component of the signal from said first counter, its counting operation being halted by the rise component of the signal from said second trigger stage.

9. A system as set forth in claim 2, wherein the signal injected to the input of said dispersive delay line is derived from a heterodyning system coupled to said system input which heterodynes the input signal with a reference signal linearly frequency-modulated through a frequency sweep the width of which is equal to half the bandwidth of the dispersive circuit, wherein said means for actuating which produce the timing signal comprises a trigger stage to which the system input is coupled, said last named trigger stage being connected, on the one hand, to a first monostable trigger stage arranged for producing a signal of duration $n T$, and, on the other hand, to a counter arranged for producing a signal of duration $n T_0$, a second monostable trigger stage connected to said last named counter for producing a signal of duration $n T$; said first monostable trigger stage being controllably connected to said heterodyning system including a first sweep generator which produces a linear signal of ramp or sawtooth form, a controlled-frequency oscillator responsive to output of said first sweep generator and a modulator supplied at its first input with the signal for processing and producing a resultant signal at its output which is connected to said first coupling means in its first position, said first coupling means being controlled by the signal from said first monostable trigger stage, and wherein said system output is connected to a load circuit comprising a display unit in the form of a cathode-ray tube having an input connected through an envelope detector to said second coupling means for selectively receiving output signals of said dispersive line, and a time-base input connected to a second sweep generator, said signal from said other monostable trigger stage being arranged to control said second coupling means, said second sweep generator and a modulating electrode of said display unit so as to display upon the screen of the display unit $n (B_1 T_1)/4$ spectrum lines in respect of each analyzed signal section.

10. A system as claimed in claim 7 for real-time spectral analysis and in which the signal applied to said input of said dispersive delay line is derived from a heterodyning system which heterodynes a time-compressed section of the input signal with a reference signal linearly frequency-modulated through a frequency sweep whose width is equal to half the bandwidth $B_1$ of said dispersive delay line, said heterodyning system being connected between said first coupling means and a time compressor circuit, said input signal having sampled sections time-compressed in said compressor circuit, a master clock, said master clock comprising said means for actuating and which produces a signal of duration n T which controls the operation of said heterodyning system and positioning of said first coupling means and also triggers said timing circuit which produces a signal of duration $nT_0$ for controlling the operation of said second coupling means and that of the load circuit to which $n (B_1 T_1)/4$ successive spectrum lines are applied.

* * * * *